United States Patent
Muth et al.

(10) Patent No.: US 10,229,009 B2
(45) Date of Patent: Mar. 12, 2019

(54) OPTIMIZED FILE SYSTEM LAYOUT FOR DISTRIBUTED CONSENSUS PROTOCOL

(71) Applicant: NetApp, Inc., Sunnyvale, CA (US)

(72) Inventors: John Muth, Scotts Valley, CA (US); Juan C. Gomez, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 507 days.

(21) Appl. No.: 14/971,807

(22) Filed: Dec. 16, 2015

(65) Prior Publication Data

US 2017/0177448 A1 Jun. 22, 2017

(51) Int. Cl.
G06F 17/00 (2006.01)
G06F 11/14 (2006.01)
G06F 17/30 (2006.01)
G06F 3/06 (2006.01)

(52) U.S. Cl.
CPC ............ *G06F 11/1464* (2013.01); *G06F 3/06* (2013.01); *G06F 17/30088* (2013.01); *G06F 17/30227* (2013.01); *G06F 2201/84* (2013.01)

(58) Field of Classification Search
CPC .... G06F 11/1076; G06F 3/061; G06F 3/0619; G06F 3/0689; G06F 3/0641; G06F 3/067
See application file for complete search history.

(56) References Cited

U.S. PATENT DOCUMENTS

| | | | |
|---|---|---|---|
| 5,937,425 A | 8/1999 | Ban | |
| 6,219,800 B1 | 4/2001 | Johnson et al. | |
| 7,191,357 B2 | 3/2007 | Holland et al. | |
| 7,249,150 B1 | 7/2007 | Watanabe et al. | |
| 7,680,837 B2 | 3/2010 | Yamato | |
| 7,814,064 B2 | 10/2010 | Vingralek | |
| 7,921,169 B2 | 4/2011 | Jacobs et al. | |
| 7,996,636 B1 | 8/2011 | Prakash et al. | |
| 8,082,390 B1 | 12/2011 | Fan et al. | |
| 8,099,396 B1 | 1/2012 | Novick et al. | |
| 8,140,860 B2 | 3/2012 | Haswell | |
| 8,156,290 B1 | 4/2012 | Vanninen et al. | |

(Continued)

OTHER PUBLICATIONS

Cornwell, Michael, "Anatomy of a Solid-state Drive," ACM Queue—Networks, vol. 10, No. 10, Oct. 2012, pp. 1-7.

(Continued)

*Primary Examiner* — Truong V Vo
(74) *Attorney, Agent, or Firm* — Cesari and McKenna, LLP

(57) ABSTRACT

A layout of a file system is optimized to meet storage requirements of a distributed consensus protocol implemented on a plurality of nodes of a cluster. Illustratively, the file system has an on-disk layout representation that enables efficient input/output (I/O) operation performance. The on-disk layout of the file system embodies a plurality of file system objects: membership, snapshot and log objects. Each object is allocated an area or region (e.g., a contiguous storage space) on-disk. In addition, each object has two or more storage container instances, e.g., files. In the case of snapshot and membership objects, the two files of each object are used in a circular (alternating) fashion so that write operations directed to a first file storing a current copy of the snapshot/membership content may be performed without destroying a previous committed copy of the snapshot/membership content stored in a second file.

20 Claims, 6 Drawing Sheets

(56) References Cited

U.S. PATENT DOCUMENTS

| | | |
|---|---|---|
| 8,205,065 B2 | 6/2012 | Matze |
| 8,341,457 B2 | 12/2012 | Spry et al. |
| 8,417,987 B1 | 4/2013 | Goel et al. |
| 8,495,417 B2 | 7/2013 | Jernigan, IV et al. |
| 8,539,008 B2 | 9/2013 | Faith et al. |
| 8,560,879 B1 | 10/2013 | Goel |
| 8,589,625 B2 | 11/2013 | Colgrove et al. |
| 8,595,595 B1 | 11/2013 | Grcanac et al. |
| 8,732,426 B2 | 5/2014 | Colgrove et al. |
| 8,775,868 B2 | 7/2014 | Colgrove et al. |
| 8,832,373 B2 | 9/2014 | Colgrove et al. |
| 8,850,108 B1 | 9/2014 | Hayes et al. |
| 8,856,593 B2 | 10/2014 | Eckhardt et al. |
| 2003/0120869 A1 | 7/2003 | Lee et al. |
| 2003/0191916 A1 | 10/2003 | McBrearty et al. |
| 2004/0267836 A1* | 12/2004 | Armangau .......... G06F 11/1435 |
| 2005/0144514 A1 | 6/2005 | Ulrich et al. |
| 2007/0143359 A1 | 6/2007 | Uppala |
| 2010/0042790 A1 | 2/2010 | Mondal et al. |
| 2010/0088296 A1 | 4/2010 | Periyagaram et al. |
| 2011/0035548 A1 | 2/2011 | Kimmel et al. |
| 2011/0213928 A1 | 9/2011 | Grube et al. |
| 2012/0079318 A1 | 3/2012 | Colgrove et al. |
| 2012/0084506 A1 | 4/2012 | Colgrove et al. |
| 2012/0290788 A1 | 11/2012 | Klemm et al. |
| 2013/0018854 A1 | 1/2013 | Condict |
| 2013/0019057 A1 | 1/2013 | Stephens |
| 2013/0138862 A1 | 5/2013 | Motwani et al. |
| 2013/0238832 A1 | 9/2013 | Dronamraju et al. |
| 2013/0238932 A1 | 9/2013 | Resch |
| 2013/0268497 A1 | 10/2013 | Baldwin et al. |
| 2013/0346810 A1 | 12/2013 | Kimmel et al. |
| 2014/0215129 A1 | 7/2014 | Kuzmin et al. |
| 2014/0379965 A1 | 12/2014 | Gole et al. |

OTHER PUBLICATIONS

"Cuckoo hashing," Wikipedia, http://en.wikipedia.org/wiki/Cuckoo_hash, Apr. 2013, pp. 1-5.

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key—Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Hwang, Kai et al., "RAID-x: A New Distributed Disk Array for I/O-centric Cluster Computing", IEEE High-Performance Distributed Computing, Aug. 2000, pp. 279-286.

Lamport, Leslie, "The part-time parliament." ACM Transactions on Computer Systems (TOCS) 16.2 (1998): 133-169.

Leventhal, Adam H., "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the 23rd ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Ongaro, Diego et al., "In Search of an Understandable Consensus Algorithm," Stanford University, May 2013. Downloaded from https://ramcloud.stanford.edu/wiki/download/attachments/11370504/raft.pdf, 14 pages.

Ongaro et al., "In search of an understandable consensus algorithm (extended version)." 2014, 18 Pages.

Pagh, Rasmus, et al., "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the 13th ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

\* cited by examiner

OPTIMIZED FILE SYSTEM LAYOUT FOR DISTRIBUTED CONSENSUS PROTOCOL

BACKGROUND

Technical Field

The present disclosure relates to storage systems and, more specifically, to an optimized file system layout of a storage system.

Background Information

A cluster of storage systems typically includes one or more storage devices, such as solid state drives (SSDs) embodied as flash storage devices, connected to one or more nodes of the cluster into which information may be entered, and from which the information may be obtained, as desired. Each storage system may implement a high-level module, such as a file system, to logically organize the information stored on the devices as storage containers, such as files. Each storage container may be implemented as a set of data structures, such as data structures (blocks) on SSD that store data for the storage containers and metadata structures in memory of the storage system that describe the data of the storage containers. For example, the metadata may describe, e.g., identify, storage locations on the devices for the data.

A distributed consensus protocol may be employed in the cluster to maintain configuration information pertaining to a current state of the cluster and stored on local storage, e.g., SSD, of the nodes. Typically, the distributed consensus protocol uses a generic file system having a generic on-disk format or layout of files to store the configuration information, e.g., one file for node membership in the cluster, one file for a snapshot of the configuration information, and multiple files for log entries. Multiple issues may arise in such an implementation, including (i) files used for snapshots of the current state may be fragmented, (ii) if a rate of change is high too many log entries may accumulate before they are purged, and (iii) log entries which are usually read in sequence may be fragmented, necessitating substantial overhead to read sequentially. In addition, each update to a file used for snapshot, log or membership usually manifests as multiple write and commit operations to disk, e.g., for data and metadata. As a result, some operations may partially commit the data or metadata.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
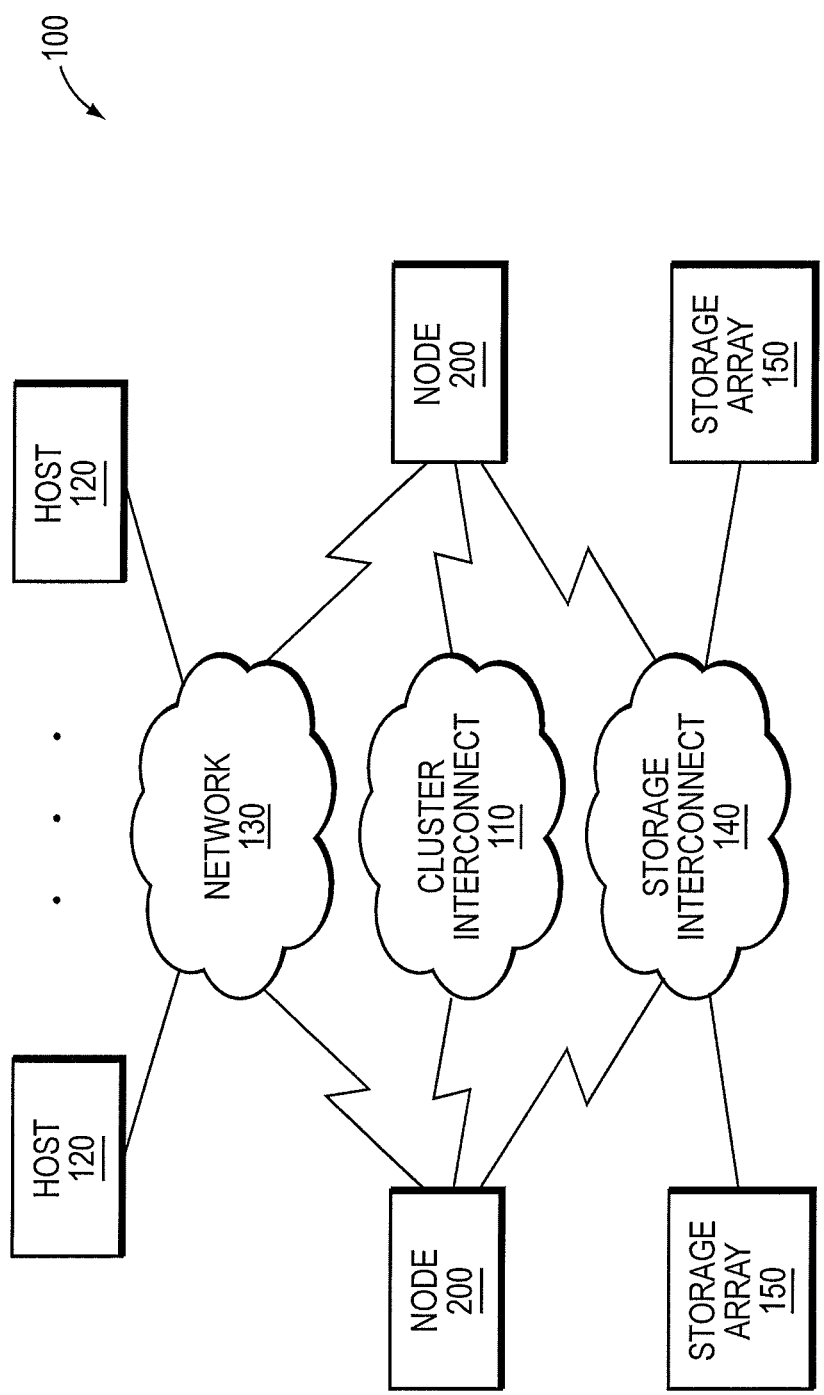
FIG. 1 is a block diagram of a plurality of nodes interconnected as a cluster.

The embodiments described herein are directed to a layout of a file system that is optimized to meet storage requirements of a distributed consensus protocol implemented on a plurality of nodes of a cluster. Illustratively, the file system is a Third Copy File System (TCFS) having an on-disk layout representation that enables efficient storage and access of information, e.g., efficient input/output (I/O) operation performance. The on-disk layout of the file system embodies a plurality of file system objects: membership, snapshot and log objects. Each object is allocated an area or region (e.g., a contiguous storage space) on-disk, such as solid state drives (SSDs). In addition, each object has two or more storage container instances, e.g., files. In the case of snapshot and membership objects, the two files of each object are employed in a circular (alternating) arrangement so that write operations directed to a first file storing a current copy of the snapshot/membership content may be performed without destroying a previous committed copy of the snapshot/membership content stored in a second file. Each file for each snapshot and membership object is protected with an error correcting code (ECC) that enables the distributed consensus protocol to detect and recover from partial write operations by falling back to a previous committed (and valid) copy. That is, each object may be retrieved as a current or previously committed copy. In contrast, each log object is written as a whole atomically, so that an on-SSD copy is valid. Each file may also contain a header that describes the file (e.g., a size of the file) to enable the TCFS to perform a multi-block read operation to the end of the file instead of having to serially read all the blocks using a multitude of operations.

In an embodiment, each log entry in the log file includes a header containing ECC and other metadata describing the entry. Configuration updates for the distributed consensus protocol are organized as log records and persistently stored (written) to the log file as log entries of a sequential log. Illustratively, writing of a log entry is an atomic multi-block write operation that either succeeds or fails. Log entries with contiguous sequence numbers may be placed in the log file sequentially so that read operations may retrieve the records in order of sequence number efficiently. Metadata regarding a total size of log entries of the log is maintained only in a memory of each node so as to avoid updates to the log entries and/or to metadata blocks, which may lead to lack of consistency in the event of a failure. Illustratively, each log file may have an end-of-file (EOF) marked (e.g., as a marker) with an empty block during each write operation so as to facilitate determination of the end of the file during a mount operation without the need to maintain metadata describing the log file elsewhere on-disk. Accordingly, log file metadata may be maintained in the node memory and rebuilt at file system mount time (e.g., upon restart) by traversing the log file and locating the EOF marker.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
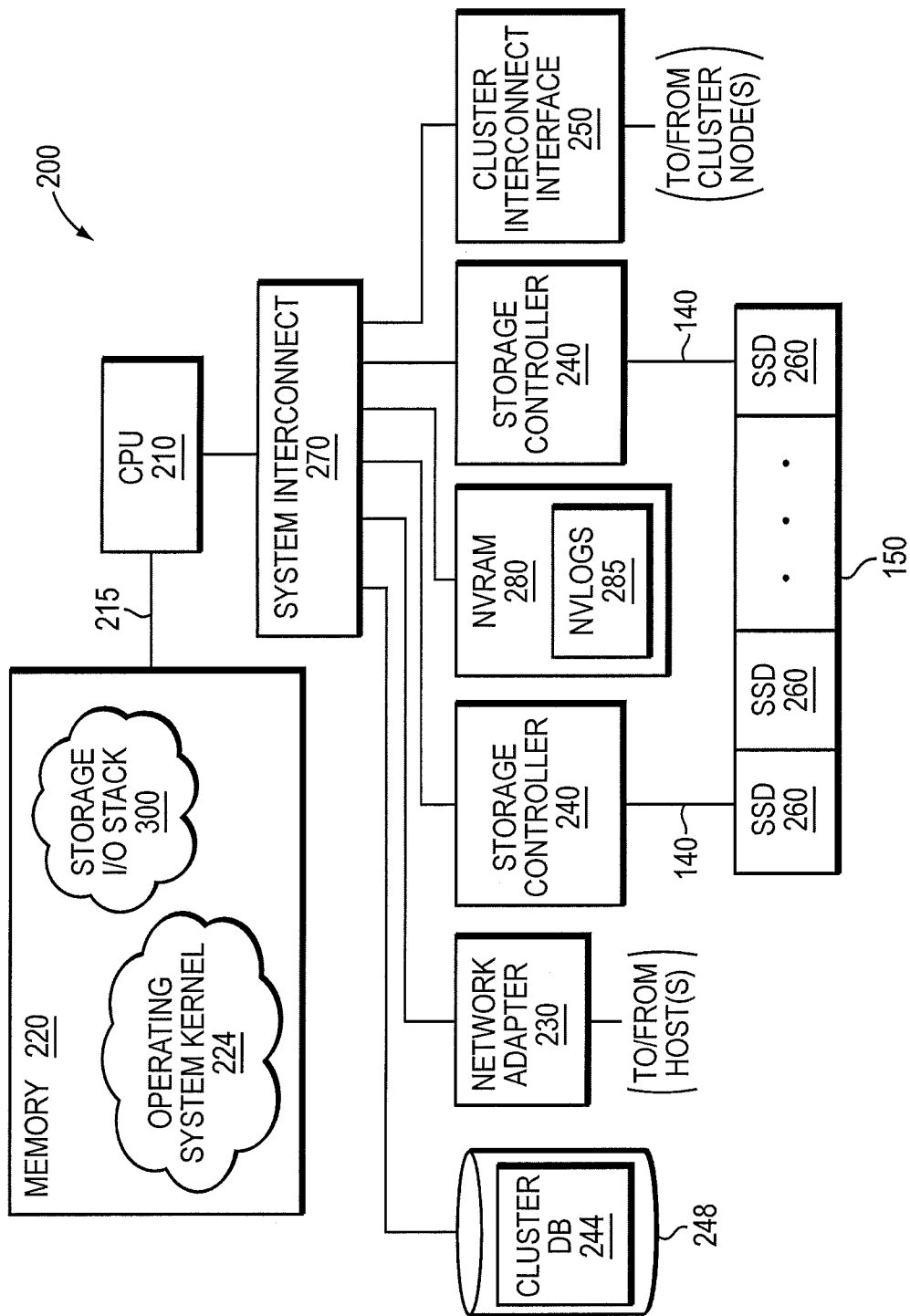
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250, and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices (disks) such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood by those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements, such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (CDB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
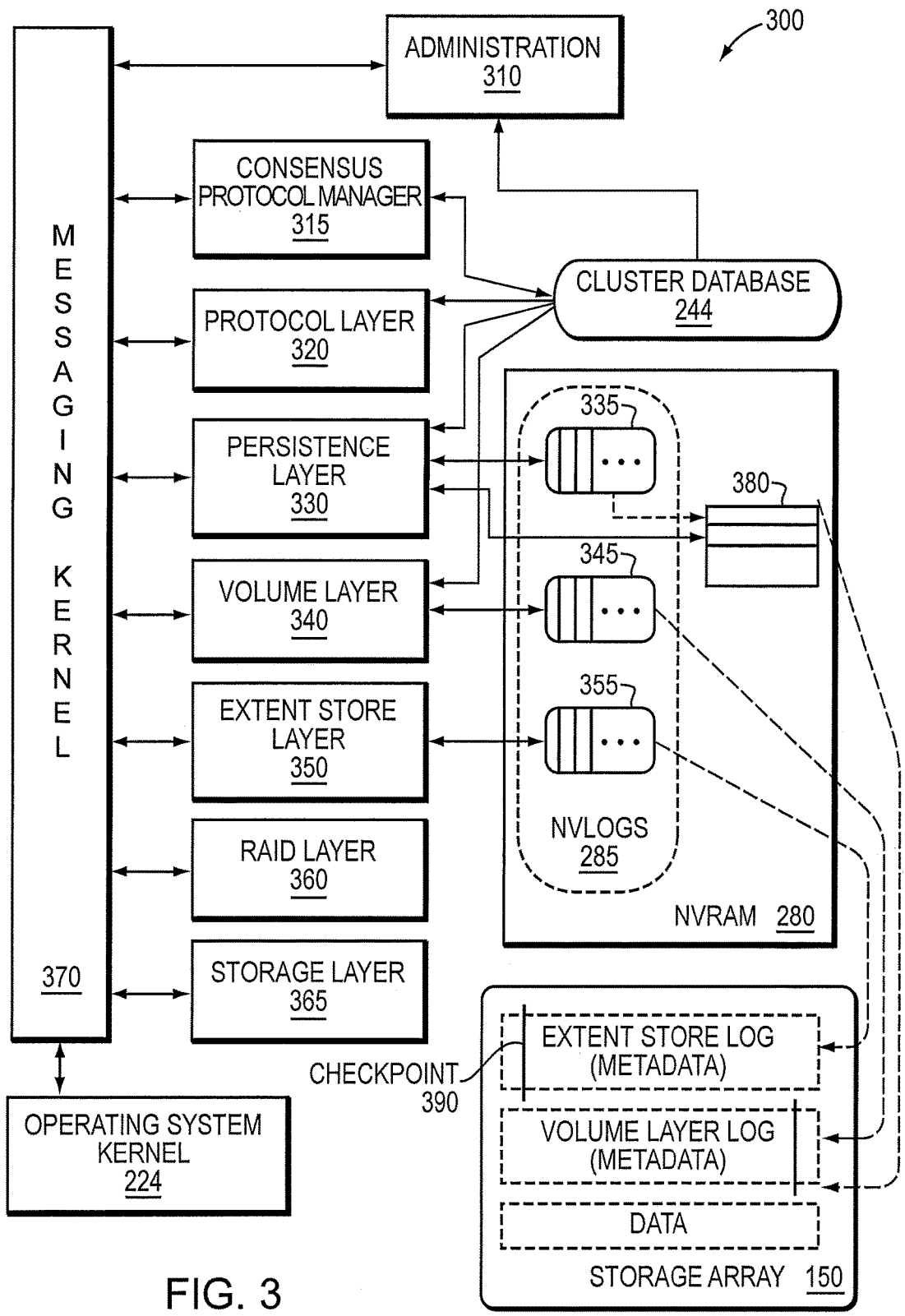
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM 280 (storing NVLogs 285) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LB A) of the LUN, a length (i.e., amount of data) and, in the case of a write request, write data. The protocol layer 320 receives the I/O request and forwards it to the persistence layer 330, which records the request into a persistent write-back cache 380 illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at a SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas retirement of log entries ensures that the entries accumulated in the volume layer log 345 synchronize with the metadata checkpoints committed to the storage array 150 by, e.g., retiring those accumulated log entries stored prior to the recorded checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings (less than the total), are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
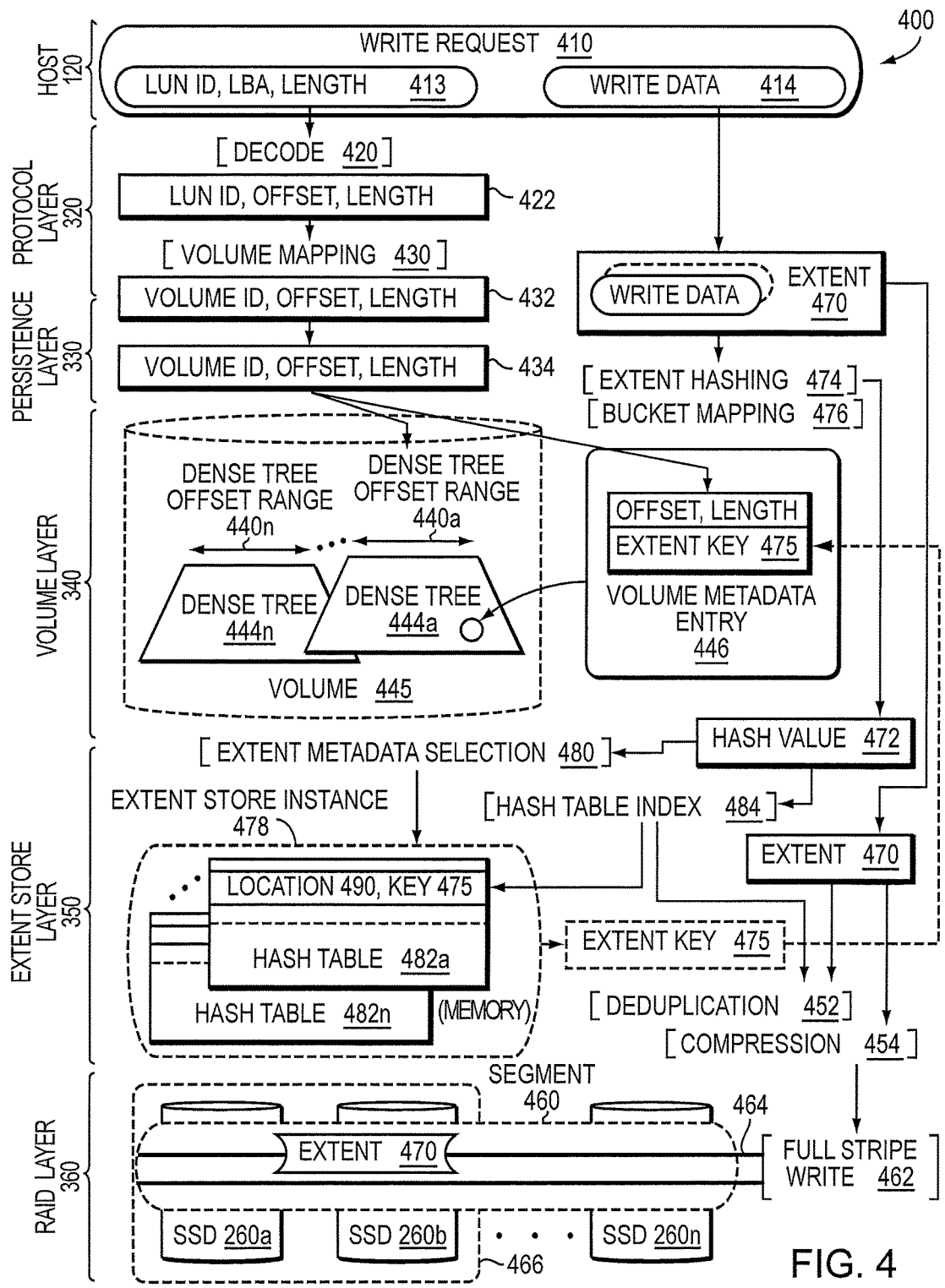
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (i.e., extent store instance 478) that is responsible for storing the new extent 470. Note, the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 470, and (ii) extracts a hash table index 484 from the hash value 472 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the extent metadata selection technique 480 described herein. If a table entry with a matching extent key is found, then the SSD location 490 mapped from the extent key 475 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count in the table entry for the existing extent is incremented and the extent key 475 of the existing extent is passed to the appropriate volume layer instance for storage within an entry (denoted as volume metadata entry 446) of a dense tree metadata structure 444 (e.g., dense tree 444a), such that the extent key 475 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or to produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripes 464 across the RAID group 466, illustratively as one or more full stripe writes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer log 345. Accordingly, the I/O (write) request is sufficiently stored on SSD 260 of the cluster.

Read Path

Figure 5:
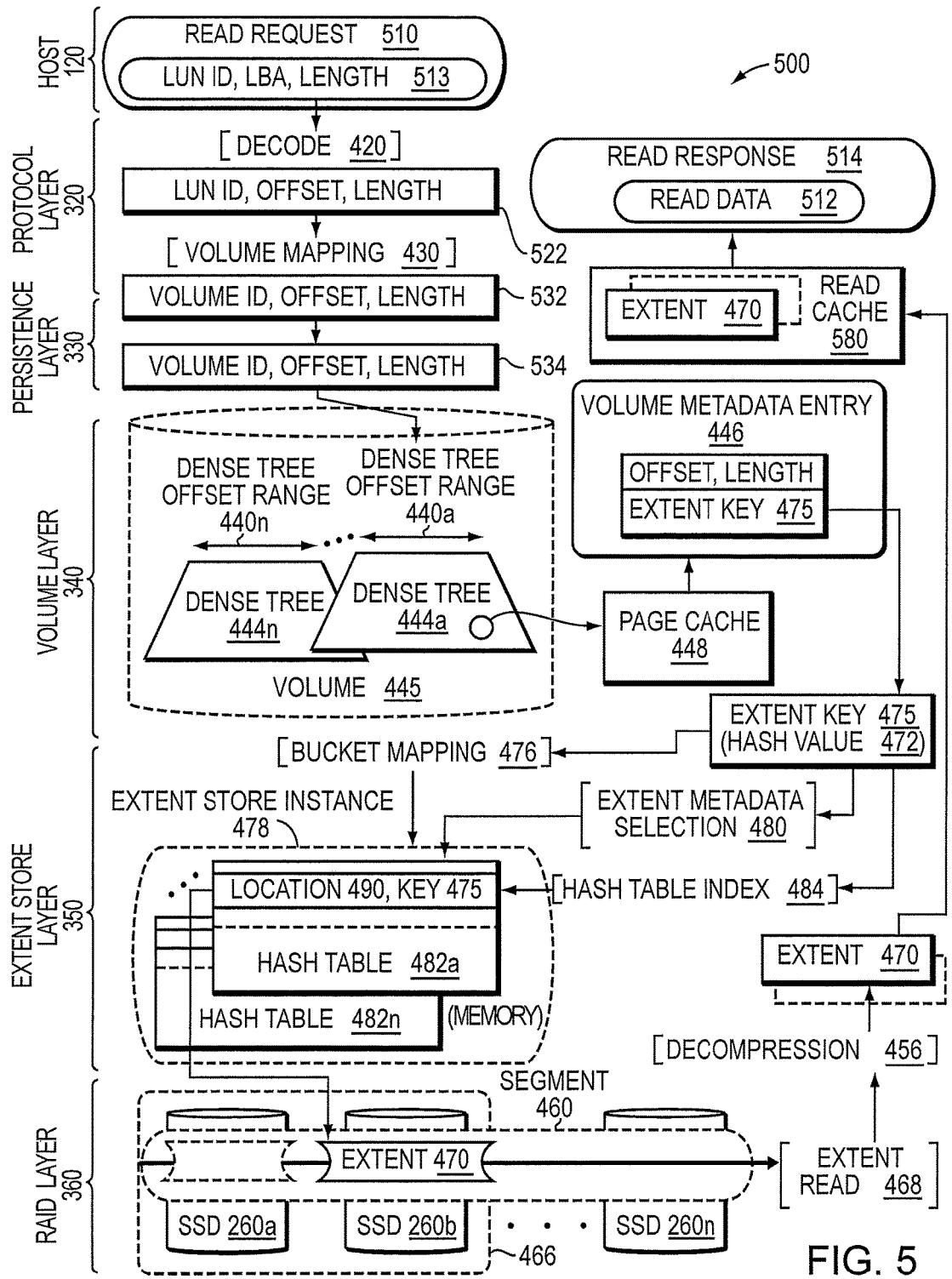
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write-back cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC, for inter-node communication) or the IPC mechanism (e.g., message threads, for intra-node communication).

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 475 associated with one or more extents 470 (or portions of extents) within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched to find any overlapping entries. This process is then iterated until one or more volume metadata entries 446 of a level are found to ensure that the extent key(s) 475 for the entire requested read range are found. If no metadata entries exist for the entire or portions of the requested range, then the missing portion(s) are zero filled.

Once found, each extent key 475 is processed by the volume layer 340 to, e.g., implement the bucket mapping technique 476 that translates the extent key to an appropriate extent store instance 478 responsible for storing the requested extent 470. Note that, in an embodiment, each extent key 475 may be substantially identical to the hash value 472 associated with the extent 470, i.e., the hash value as calculated during the write request for the extent, such that the bucket mapping 476 and extent metadata selection 480 techniques may be used for both write and read path operations. Note also that the extent key 475 may be derived from the hash value 472. The volume layer 340 may then pass the extent key 475 (i.e., the hash value from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 480 that (i) selects an appropriate hash table 482 (e.g., hash table 482a) from a set of hash tables within the extent store instance 478, and (ii) extracts a hash table index 484 from the extent key 475 (i.e., hash value 472) to index into the selected hash table and lookup a table entry having a matching extent key 475 that identifies a storage location 490 on SSD 260 for the extent 470. That is, the SSD location 490 mapped to the extent key 475 may be used to retrieve the existing extent (denoted as extent 470) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Optimized File System Layout

Failover in a cluster typically depends on a quorum (or distributed consensus protocol) to guarantee that no two disjoint sets of nodes within the cluster each attempt to make progress (e.g., write to disk) on their own, potentially leading to data corruption (i.e., a "split brain" condition). The quorum may be implemented as a voting scheme, where each node in the cluster is granted a number of votes (e.g., one) and as long as a majority of votes allocated across the cluster is cast among non-failing nodes (surviving nodes), the surviving nodes may continue to operate as the cluster and make progress. Each node maintains configuration information organized as the CDB 244, which may be embodied as changes according to a distributed consensus-based protocol. Illustratively, a consensus protocol manager 315 (see FIG. 3) maintains (1) a local snapshot of the current state of the cluster, (2) log entries representing uncommitted changes to the current state (i.e., a current snapshot) and (3) a current view of node membership in the cluster. The snapshot and log entries are generally tagged with increasing sequence numbers. Log entries whose sequence numbers are newer than the sequence number of the current snapshot represent changes which are yet to be integrated into the local snapshot. Log entries with sequence numbers older or equal to that of the current snapshot represent changes that have already been committed to the current snapshot state, and hence can be discarded.

Exemplary distributed consensus protocols include "Raft" as described in *In Search of an Understandable Consensus Algorithm (Extended Version)* by D. Ongaro et. al, Proceedings of 2014 Usenix Annual Technical Conference (ATC), pp. 305-319; and "Paxos" as described in *The part-time parliament* by Leslie Lamport, ACM Transactions on Computer Systems, 16(2), May 1998, pp. 133-169. Changes to the CDB may be maintained on a third copy file system (TCFS) stored on the local service storage device 248 of the node, wherein the TCFS (1) logs changes to the CDB, (2) maintains a snapshot of those logged changes; and (3) maintains current node membership in the cluster. Illustratively, the configuration information is stored as records of the CDB and embodied as a sequence (i.e., log) of configuration updates (stored to a TCFS log object), wherein examples of the updates include (i) LUNs that have been created, (ii) mapping of the LUNs to various initiators/ initiator groups, (iii) volume names, and (iv) a number of volumes. There may be multiple sources in the cluster that provide updates to a CDB record (e.g., a user creating a LUN and a node re-configuration). Further, these updates may occur at any time as, e.g., asynchronous events. There also may be internally generated CDB update events (i.e., log entries) representing configuration state changes, e.g., failure of a node, which are represented by one or more CDB configuration updates.

Figure 6:
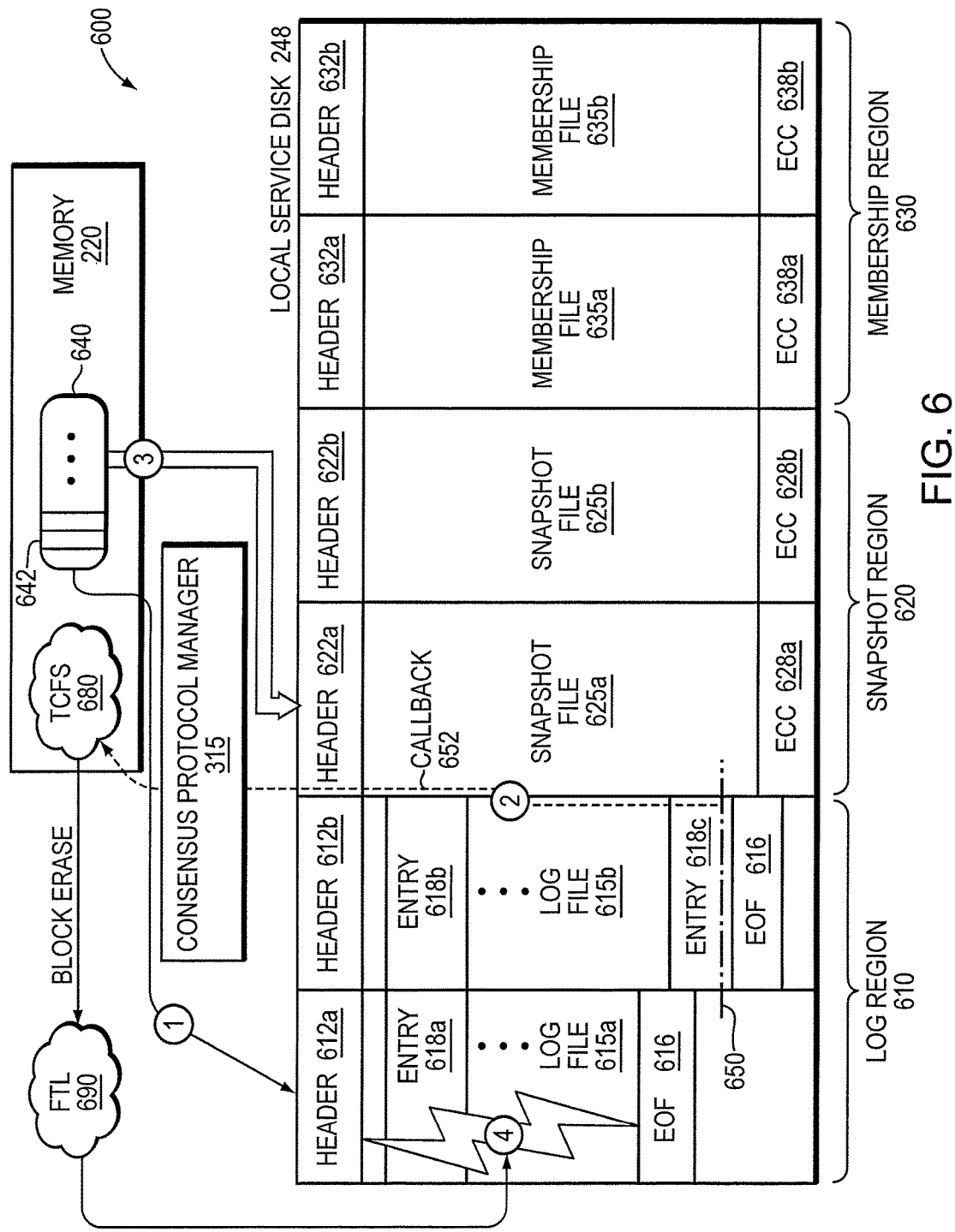
FIG. 6 is a block diagram of an optimized on-disk layout of a file system.

The embodiments described herein are directed to a layout of a file system (i.e., the TCFS) that is optimized to meet storage requirements of a distributed consensus protocol implemented (e.g., executed by CPU 210) on a plurality of nodes of a cluster. Illustratively, the TCFS has an on-disk layout representation that enables efficient storage and access of information, e.g., efficient I/O operation performance. FIG. 6 is a block diagram of an optimized on-disk layout of the file system. The on-disk layout 600 of the file system embodies a plurality of file system objects: membership, snapshot and log objects. Each object is allocated an area or region 610, 620, 630 (e.g., a contiguous storage space) on SSD, e.g., a log region 610, a snapshot region 620, and a membership region 630. In addition, each object has two or more storage container instances, e.g., files, such as log file 615a,b. In the case of snapshot and membership objects, the two files of each object (e.g., 625a,b and 635a,b, respectively) are employed (used) in a circular (alternating) arrangement so that write operations directed to a first file storing a current copy, e.g., snapshot file 625a, of the snapshot/membership content may be performed without destroying a previous committed copy of the snapshot/membership content stored in a second file, e.g., snapshot file 625b. Each file for the snapshot and membership objects is protected with an error correcting code (ECC) 628, 638 that enables the distributed consensus protocol to detect and recover from partial write operations by falling back to the previous (and valid) committed copy. That is, each snapshot or membership object may be retrieved as a current copy, e.g., membership file 635a, or previously committed copy, e.g., membership file 635b. In contrast, each log object (i.e., log entry 618) is written as a whole (e.g., as an atomic operation that either succeeds or fails), so that an on-SSD copy is valid. Illustratively, each file also contains a header 612, 622, 632 that describes the file (e.g., a size of the file) to enable the file system (TCFS 680) to perform a multi-block read operation to the end of the file instead of having to serially read all the blocks using a multitude of operations.

In an embodiment, a log region 610 of the on-disk layout is configured to store sequential logs representing a current state of the cluster as provided by the distributed consensus protocol, such as Paxos or Raft. Data structures 640 residing in memory (in-core) of each node are used to keep track of the persisted state (information) stored on the SSD. Configuration updates for the distributed consensus protocol are received in-core, organized as log records 642, and persistently stored (written) (numeral "1") to a log file 615,a,b of the log region 610 (on SSD) as a sequential log. Subsequently, in response to a callback (numeral "2") initiated by the file system (TCFS), the sequential log may be compressed to store a current state of the updates as, e.g., a checkpoint or snapshot representing a point-in-time image of the log (numeral "3"). Illustratively, one or more in-core log entries 642 are passed to the TCFS for recording in the snapshot file 625a,b. As described herein, the snapshot is stored in a snapshot region 620 of the on-disk layout, while the sequential logs are stored in the log region 610 of the layout 600. Once the state has been stored as a snapshot, the storage space of log file 615a prior to the snapshot may be reclaimed, e.g., content of that log file 615a may be cleared (erased) (numeral "4"). Note that use of the callback permits concurrency controlled by a user (i.e., caller) of the TCFS, such as the consensus protocol manager 315, so that log entries 618a,b may be recorded in the log files 615a,b while also recording the snapshot in snapshot files 625a,b.

Illustratively, the snapshot is an accumulation of configuration updates (state) recorded in the sequential log as log entries 618 of log file 615a at a point-in-time as defined by a sequence number (not shown) of a last log entry applied to the log. The snapshot is persisted into a snapshot file 625a of the snapshot region 620 to enable reclaiming (garbage collection) of the log entries stored in the log file within the log region. Garbage collection of log entries includes those log entries 618a that occurred before the point-in-time represented by the snapshot, i.e., the log entries having lower sequence numbers than the last log entry. The file system (TCFS 680) may accumulate the log entries (e.g., as log records 642) in-core until they are compressed and stored as a snapshot to the snapshot file 625a. At that point, the log entries up to the snapshot (point-in-time) may be reclaimed and cleared.

In an embodiment, the log region of the on-disk layout includes two or more log files 615a,b organized in a double-buffer arrangement to enable continuous storage of log records (i.e., as entries 618) in one of the log files as a snapshot is generated and stored in one of the snapshot files, e.g., 625a, and as the log entries included in the snapshot (point-in time) are cleared (reclaimed). Thus, generation of the snapshot may be performed during operation of the file system (i.e., while logging entries to the log object). For example, the file system may store log entries in a first log file of the log region until a threshold is reached, which triggers generation of a snapshot. Meanwhile, the file system may continue to store log entries in a second log file of the log region in accordance with the double buffer arrangement, i.e., logging before and after creation of the snapshot.

In an embodiment, each log entry in the log file includes a header containing ECC and other metadata describing the entry. As noted, configuration updates for the distributed consensus protocol are organized as log records (entries) and persistently stored (written) to the log file of the TCFS as log entries of a sequential log. Illustratively, writing of a log entry 618 is an atomic multi-block write operation that either succeeds or fails. Log entries with contiguous sequence numbers are placed in the log file 615 sequentially so that read operations may retrieve the records in order of sequence number efficiently. Metadata regarding a total size of log entries of the log is maintained only in the memory, e.g., in data structure 640, within of each node, so as to avoid updates to the log entries 618 and/or to metadata blocks, which may lead to lack of consistency in the event of a failure. In an embodiment, each log file 615a,b may have an end-of-file (EOF) marked (e.g., as a marker 616) with an empty block during each write operation so as to facilitate determination of the end of the file during a mount operation without the need to maintain metadata describing the log file elsewhere on-disk. Accordingly, log file metadata may be maintained in the node memory and may be rebuilt at file system mount time (e.g., upon restart) by traversing the log file and locating the EOF marker 616.

Illustratively, the snapshots are stored (written) to the snapshot region in an alternating pattern between the two snapshot files such that a current snapshot may be written (and committed) without destroying a previous snapshot. That is, at least one of the two snapshots is valid and retrievable. For example, assume a system failure occurs during writing of the current snapshot to the first snapshot file 625a before the current snapshot is committed. The file system may recover by rolling back to the previous snapshot state stored in the second snapshot file 625b which is undisturbed by the failure. Notably, no log entries pertaining to the current snapshot state may be reclaimed (i.e., discarded) until the current snapshot is completely and successfully written to SSD.

In an embodiment, the TCFS 680 includes on-demand snapshotting initiated by a callback 652 to the consensus protocol (i.e., the consensus protocol manager 315) that requests a snapshot be made by the TCFS using in-core log entries older that a last log entry 618c written by the TCFS. Illustratively, the callback 652 includes a sequence number (not shown) of the last log entry 618c recorded (e.g., in log file 615b) by the TCFS so that the consensus protocol manager 315 may select log entries for the snapshot. When one of the log files that is currently being written with log entries fills up (exceeds a threshold 650), callback 652 is made to the consensus protocol manager 315. The callback includes a parameter that represents the sequence number of the log of the last log entry 618c in the log file 615b. In response to the callback 652, a snapshot is generated that includes at least the last log entry in the log file, thereby allowing the content of the file to be discarded (i.e., reclaimed) and the log file reused. Notably, the sequence number may be used as an effective timestamp for the snapshot and passed back to the TCFS indicating a point-in-time prior to which log entries in the log file 615a,b may be reclaimed by the TCFS. That is, the TCFS may discard log entries in the log files having a sequence number lower than the sequence number of the snapshot once that snapshot is completed.

Advantageously, on-demand snapshotting enables generation of a snapshot of the current state when storage space is sufficiently low (e.g., below the threshold 650) to hinder recording of additional log entries. That is, the callback is used to generate snapshots when necessary, thus reducing performance overhead as well as storage space as compared to conventional snapshots that may be generated periodically (e.g., at fixed intervals of time) and consume excessive log space in the interval between snapshots. In other words, a disadvantage of the conventional snapshot approach is that if the rate of change (i.e., rate of new log entries) is too high, the log space may be filled too soon; and if the rate of change is too low, performance may needlessly suffer from generation of more snapshots than necessary.

In an embodiment, the optimized on-disk file system layout also enables clearing of a log file with a single operation. Illustratively, the file system (TCFS 680) has an on-disk layout (on-SSD) that aligns the files on an erase block granularity (e.g., one or more erase blocks) of the SSD. To erase (clear) a log file, a flash erase operation (block erase) may be issued by the file system 680 to the SSD to invoke, e.g., a flash erase block function of flash translation logic (FTL 690) of the SSDs to erase one or more blocks of the file (numeral "4") that align with log entries (or the whole file) to reclaim. Upon receiving a snapshot with a given sequence number, the file system checks whether to clear (reclaim) any of the log files by comparing the snapshot sequence number with the highest sequence number in each log file. If a log file has only sequence numbers older than the snapshot sequence number, the file system may clear the log file with the single operation directed to the FTL 690. Thus, the optimized on-disk layout leverages the FTL of SSD to enable quick and efficient erasure of blocks when clearing files. In other words, the flash logic (FTL) of SSD is leveraged to perform a logical erase block function that clears log entries aligned with erase blocks of the SSD. The logical erase block function provides a substantial performance advantage over previous systems, wherein reclaiming of log entries in response to generation of a snapshot required many I/O operations to remove log entries and/or delete files.

Operationally, configuration updates to the distributed consensus protocol are received in memory of a node by the file system and stored (written) to a log file on SSD. Upon traversing a capacity threshold 650 of the log file, the file system may issue a callback 652 to a caller (i.e., the distributed consensus manager 315) that includes a parameter representing a sequence number of a last log entry 618*c* in the (filled) log file 615*b*. The caller may then initiate a snapshot that includes at least the last log entry of the file, and initiates writing the snapshot to a first snapshot file 625*a*. Notably, the snapshot is generated on-demand using the callback when logging storage space is sufficiently low. That is, the snapshot of the current state of the log file is generated when the storage space available for recording log entries exceeds the capacity threshold (indicating insufficient storage space for recording additional log entries). Further, when another snapshot is subsequently generated (on-demand using the callback again) that subsequent snapshot is stored in a second snapshot file to avoid destruction of the previously stored snapshot in the first snapshot file. In response to issuance of the callback again, the file system (TCFS) compares the sequence number of the last log entry of the generated snapshot with a highest sequence number of each log file. If the log file has a highest sequence number that is older (less than) the sequence number of the subsequent snapshot, the file system initiates clearing (erasing) of the log file by instructing FTL of the SSD to erase one or more erase blocks storing the log file.

While there have been shown and described illustrative embodiments of a layout of a file system that is optimized to meet storage requirements of a distributed consensus protocol implemented on a plurality of nodes of a cluster, it is to be understood that various other adaptations and modifications may be made within the spirit and scope of the embodiments herein. For example, embodiments have been shown and described herein with relation to an optimized on-disk layout that organizes configuration updates for the distributed consensus protocol as log records that are persistently stored to a log file as log entries. However, the embodiments in their broader sense are not so limited, and may, in fact, also allow for the optimized on-disk layout of the file system to support efficient rollback of the log entries. Often, the last few entries in a log file may not be fully committed across the cluster when a change in leadership of the cluster members arises. Therefore, a node may be required to rollback part of the log (i.e., stored on the local service storage device 248). Illustratively, the optimized on-disk file system supports an O(1) mechanism to perform a logging operation by tracking which log entries are not fully committed in memory and maintaining direct pointers to the blocks for such log entries. The optimized file system (TCFS) may efficiently roll back a log file with a single write operation through the use of log entry information, such as a start block of each log entry, maintained in the memory (in-core) of the node.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
a cluster of storage systems coupled to a network;
a memory coupled to a processor included in each storage system, the memory configured to store a file system executable by the processor that records configuration changes to the cluster via a distributed consensus protocol; and
a storage device connected to each storage system of the cluster and configured to store an on-disk layout of the file system having a plurality of file system objects, each file system object allocated a region on the storage device, each file system object further having two or more storage container instances, wherein the storage container instances for at least one object are used in an alternating arrangement so that write operations directed to a first storage container instance storing a current copy of content is performed without destroying a previous committed copy of the content stored in a second storage container instance.

2. The system of claim 1 wherein the storage container instances are files.

3. The system of claim 1 wherein the storage container instances are files and wherein each file contains a header that describes the file to enable the file system to perform a multi-block read operation to an end of the file instead of having to serially read all blocks using a multitude of operations.

4. The system of claim 1 wherein the plurality of file system objects include membership, snapshot and log objects.

5. The system of claim 1 wherein the plurality of file system object includes a log object written as a whole atomically.

6. The system of claim 1 wherein the at least one object is one of a snapshot and a membership objects, and wherein the content is one of snapshot and membership content.

7. The system of claim 1 wherein at least one file object is protected with an error correcting code that enables the distributed consensus protocol executed by the processor to detect and recover from partial write operations by falling back to the previous committed copy.

8. The system of claim 1 wherein a log region of the on-disk layout is configured to store sequential logs representing a state of the cluster as provided by the distributed consensus protocol.

9. The system of claim 1 wherein the distributed consensus protocol is one of Paxos and Raft.

10. The system of claim 1 wherein configuration updates for the distributed consensus protocol are received at the memory, organized as log records, and persistently stored to a log file of a log region as a sequential log.

11. The system of claim 1 wherein configuration updates for the distributed consensus protocol are stored as a compressed sequential log having a current state of the configuration updates as a snapshot representing a point-in-time image of the log.

12. The system of claim 1 wherein a current state of configuration changes are stored as a snapshot in a snapshot region of the on-disk layout.

13. The system of claim 12 wherein, in response to the current state of the configuration changes stored as a snapshot on the storage device, a storage space of a log file storing the configuration changes prior to the snapshot is reclaimed.

14. A method comprising:
   connecting a storage array to a storage system of a cluster of storage systems, the storage system having a processor configured to store a file system executable by the processor to record configuration changes to the cluster via a distributed consensus protocol;
   storing an on-disk layout of the file system on the storage array, the on-disk layout of the file system having a plurality of file system objects;
   allocating a region on disk for each file system object, each file system object further having two or more files; and
   employing the files for at least one object in an alternating arrangement so that write operations directed to a first file storing a current copy of content is performed without destroying a previous committed copy of the content stored in a second file.

15. The method of claim 14 further comprising:
   describing each file with a header that enables the file system to perform a multi-block read operation to an end of the file instead of having to serially read all blocks using a multitude of operations.

16. The method of claim 14 wherein the plurality of file system objects include membership, snapshot and log objects.

17. The method of claim 14 further comprising:
   protecting at least one file with an error correcting code that enables the distributed consensus protocol to detect and recover from partial write operations by falling back to the previous committed copy.

18. The method of claim 14 further comprising:
   storing sequential logs in a log file of a log region of the on-disk layout, the sequential logs representing a state of the cluster as provided by the distributed consensus protocol.

19. The method of claim 14 wherein a log file storing configuration changes is rolled back with a single write operation through use of log entry information maintained in a memory of the storage system.

20. A non-transitory computer readable medium including program instructions for execution on a processor of a storage system of a cluster, the program instructions configured to:
   record changes to a cluster configuration via a distributed consensus protocol;
   store an on-disk layout of a file system on disks of a storage array connected to the storage system, the on-disk layout of the file system having a plurality of file system objects;
   allocate a region on disk for each file system object having two or more files; and
   employ the files for at least one object in an alternating arrangement so that write operations directed to a first file storing a current copy of the cluster configuration is performed without destroying a previous committed copy of the cluster configuration stored in a second file.

* * * * *